United States Patent [19]

Schmale

[11] Patent Number: 4,544,204
[45] Date of Patent: Oct. 1, 1985

[54] BACK FRAME FOR SEAT, PARTICULARLY FOR POWER VEHICLE SEAT

[75] Inventor: Gerhard Schmale, Hückeswagen, Fed. Rep. of Germany

[73] Assignee: Keiper Automobiltechnik GmbH & Co. KG, Remscheid-Hasten, Fed. Rep. of Germany

[21] Appl. No.: 440,022

[22] Filed: Nov. 8, 1982

[30] Foreign Application Priority Data

Nov. 11, 1982 [DE] Fed. Rep. of Germany ....... 3144711

[51] Int. Cl.$^4$ .............................................. B60N 1/00
[52] U.S. Cl. .................................... 297/452; 297/216; 297/444
[58] Field of Search ............... 297/216, 219, 353, 443, 297/444, 452, 457, 460

[56] References Cited

U.S. PATENT DOCUMENTS

| 2,550,479 | 4/1951 | Hoven | 297/452 |
| 3,198,578 | 8/1965 | Geoffrey et al. | 297/452 X |
| 3,663,057 | 5/1972 | Lohr et al. | 297/DIG. 2 X |
| 3,675,970 | 7/1972 | Beveday | 297/452 |
| 4,002,369 | 1/1977 | Jennings | 297/DIG. 2 |

FOREIGN PATENT DOCUMENTS

1600732 10/1981 United Kingdom ................ 297/219

Primary Examiner—William E. Lyddane
Assistant Examiner—Peter R. Brown
Attorney, Agent, or Firm—Michael J. Striker

[57] ABSTRACT

A back frame for a seat, particularly a power vehicle seat, has a transverse member, and two side members each having one end connected with the transverse member in a connecting point and another end provided with a connecting ear for connecting with a hinge of a seat pad frame, each of the side members having a U-shaped cross section with a web and front and rear legs connected with the web, the web of each of the side members narrowing from the connecting ear to the connecting point of the respective side member, the rear leg of each of the side members also narrowing from the connecting ear to said connecting point of the respective side member and having in the region of the connecting ear an assymetrical cross-section as compared with said front leg, wherein one side member is provided with a wall part which is profiled relative to a perpendicular to the web of at least one side member.

22 Claims, 16 Drawing Figures

BACK FRAME FOR SEAT, PARTICULARLY FOR POWER VEHICLE SEAT

BACKGROUND OF THE INVENTION

The present invention relates to a back frame for a seat, particularly for a power vehicle seat.

Back frames for seats have a transverse member and side members which are connected with the transverse member and provided at their free end with connecting ears for connecting with hinge parts associated with a seat pad frame. The side members have a substantially U-shaped contour whose side web narrows from the region of its connecting ear to the connecting point with the transverse member. In addition to the side web, the leg rearwardly connected to the side web of each side member also narrows from the connecting ear to the connecting point on the transverse member, and the narrowing leg in the region of its connecting ear forms an asymetrical profile cross section and is longer as compared with the other leg. In the known back frame both side members connected at their upper end by the transverse member have the greatest width at the respective side web in the region of the connecting ears, and the width gradually decreases upwardly toward the transverse member until it reaches a minimal value at the connecting point with the transverse member. This shape of the side members, is selected in dependence upon static requirements and starting from the connecting point of the slide members on the transverse member to the lower connecting ear of each side member corresponds to the increasing course of the bending moment.

It is further known to design the transverse member which connects the side members at the upper end, as a lightweight construction elastically. For increasing stability, the U-shaped profile cross section of the side web is formed with non-uniform legs. With a rigid transverse member, such a back frame is characterized by a force-path diagram which has first strong force increase over small deflection path portion of the side member, analogously to the stress-strain diagram, and shortly before attaining the basic maximal load of the back frame causes, in the event of small force increase, great deflection path. Small deflection paths mean short-time and thereby respectively high action of the accidental acceleration forces upon a person which uses the seat. For a seat user which because of the weight of its body causes a loading which is close to the loading force basic for the back frame, the initial steep curve course of the path-time-diagram is not important inasmuch as in the event of the accident the back frame passes through the entire deflection path so that the acceleration or deceleration forces acting upon the seat user do not exceed the permissable value. However, for a seat user who because of his small weight applies a considerably lower loading upon the back frame in the event of an accident, the possible deflection of the back frame is not utilized, so that the acceleration or deceleration forces act during a considerably shorter time on the lighter seat user. Thereby the permissable value is exceeded and this can lead to death of the lighter seat user.

For providing zones of identical deformation in the side members and thereby forming the deflection path of the side members proportional to the mass of the seated person, it was proposed in the known back frames, in addition to the side web, to narrow in each side member also the rearwardly connected leg in direction to the transverse member and to make this leg longer relative to the other leg, so as to form an asymetrical profile cross section. Thereby turning of the side member in the event of the accidental loading takes place, so that a relatively great deflection path at the transverse member of the back frame is obtained, resulting in a substantially flat curve course in the force-path diagram. This means that in the event of an accident any person, regardless of its weight up to the weight of a maximum acceptable value, is exposed to identical acceleration or deceleration forces. Because of the asymetrical course of the profile cross section over the entire length of the side member the frame is stabilized after a certain deflection path, and with the increasing turning of the side member, a point is attained in which the stability of each side member reaches its maximum value. In certain cases in which either the maximum value is somewhat exceeded, or the accident forces are superposed by side forces, the bending stability of the side member profile designed in accordance to the above mentioned criteria is not reached, whereby the bending back can lead to considerable injury to the seat user. A material reinforcement of the profile walls can reduce the above mentioned desirable turning of the side members in the event of accidental loading; however, the above mentioned advantages will be lost.

SUMMARY OF THE INVENTION

Accordingly, it is an object of the present invention to provide a back frame for a seat, particularly for a power vehicle seat, which avoids the disadvantages of the prior art.

More particularly, it is an object of the present invention to provide a back frame for a seat, particularly a power vehicle seat, which retains the deflection path produced by accident forces and dissipates energy, and at the same time increases the bending stability of the side members with use of optimal favorable material consumption.

In keeping with these objects and with others which will become apparent hereinafter, one feature of the present invention resides, briefly stated, in a back frame for a seat, particularly a power vehicle seat, which has a transverse member and two side members each having one end connected with the transverse member in a connecting point and another end provided with a connecting ear for connecting with a hinge of a seat pad frame, each of the side members having a U-shaped cross section with a web and front and rear legs connected with the web, the web of each of the side members narrowing from the connecting ear to the connecting point of the respective side member, the rear leg of each of the side members also narrowing from the connecting ear to said connecting point of the respective side member and having in the region of the connecting ear an assymetrical cross-section as compared with said front leg, wherein at least one leg of at least one side member is provided with a wall part which is profiled relative to a perpendicular to the web of the at least one side member.

When the back frame is designed in accordance with the present invention, it has an increased static stability and at the same time does not counteract turning of the side members required for deflection movement.

In accordance with another feature of the present invention, it is advantageous for reducing the material consumption to form the back frame so that both legs of the side members are provided at their ends facing away from the side web with angled portions forming a C-profile cross section. The angled portion on the rear narrowing leg narrows, advantageously starting from the connecting ear of its initial length in a decreasing manner to the connecting point of the side member with the transverse member.

For providing in the side members zones of identical deformability which come as close as possible to the ideal condition, in accordance with a further feature of the present invention, in addition to the side web of the side member, also all legs and leg angled portions narrow, starting from their connecting ears to their connecting point with the transverse member. For the purpose of increasing the bending stability of the side members, still a further feature of the present invention is that one or both legs connected with the side web are curved either outwardly or inwardly, and this curvature extends over the entire height of the side member.

An additional feature of the present invention is that the legs are provided with a curvature only in a partial region of their width. In some cases this curvature can be formed in the angled portions connected with the legs inwardly toward the side web, and the angled portions can be provided with corrugations.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
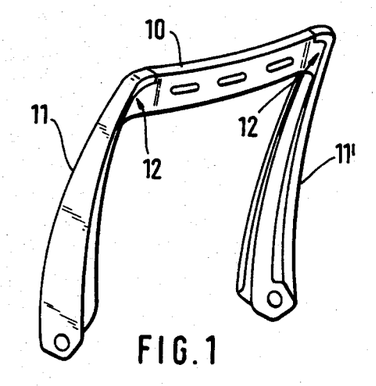
FIG. 1 is a perspective view of a back frame for a seat, particularly power vehicle seat, in accordance with the present invention.

A back frame shown in FIG. 1 has an upper transverse member 10 and side members 11 and 11' laterally connected therewith. The side members 11 and 11' are designed substantially identically and differ from one another only by their mirror-symmetrical construction.

Figure 2:
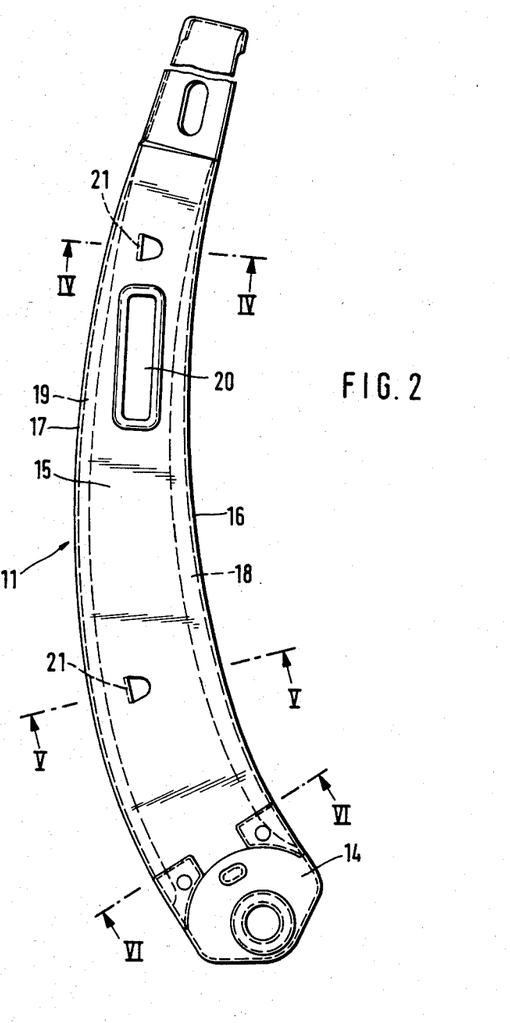
FIG. 2 is a side view of the back frame as seen from its side member, on an increased scale.
Figure 3:
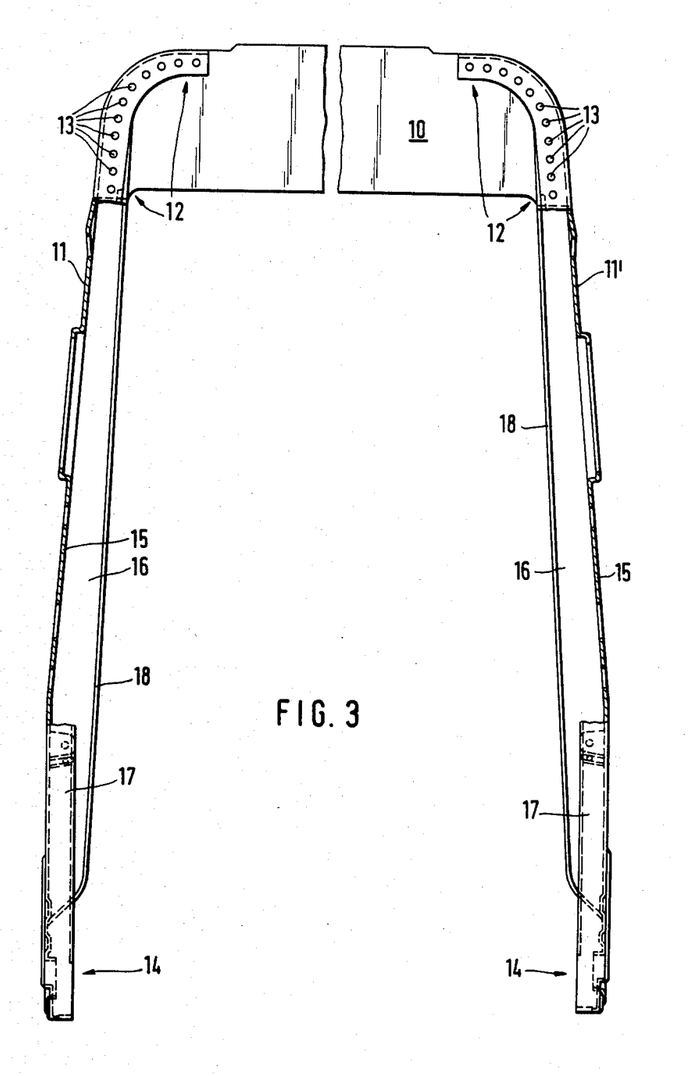
FIG. 3 is a plan view of the back frame of FIG. 2, as seen in a travelling direction.
Figure 4:
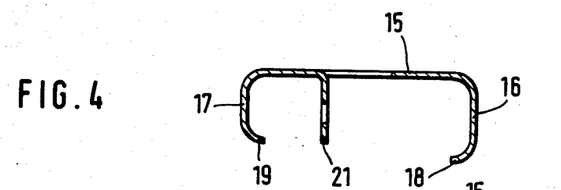
FIG. 4 is a view showing an upper section of the side member, taken along the line IV—IV in FIG. 2.
Figure 5:
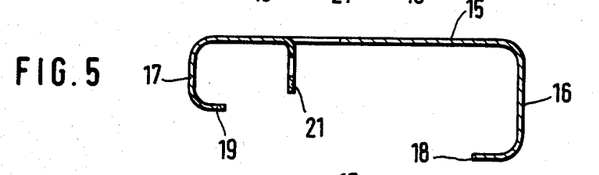
FIG. 5 is a view showing a central section of the side member, taken along the line V—V in FIG. 2.
Figure 6:
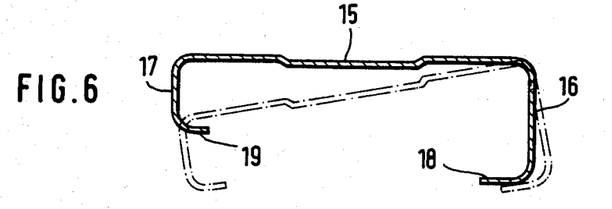
FIG. 6 is a view showing the greatest cross section of the side member in the region of its connecting ear, taken along the line VI—VI in FIG. 2.

The transverse member 10 is formed elasto-plastic by the selection of its material thickness and formation of predetermined cutout or corrugations. It is to be indicated as soft from the static point of view, under a certain loading. The transverse member 10 is fixedly connected in its connecting points 12 with upper ends of each of the side members 11 and 11', for example by a point welding 13. At the lower end of each side member 11 and 11', a connecting ear 14 extends up to the cutting line VI—VI. A not shown hinge mount for connecting the back frame with the frame of the seat part can be mounted on the connecting ear 14. In the shown embodiment the cross section of each side member is substantially C-shaped and has a side web 15 connected at both sides with legs 16 and 17.

The rear leg 16 narrows upwardly, starting from the connecting ear 14 up to the connecting point 12. In other words, the depth of the leg 16 gradually decreased from the connecting ear 14 toward the connecting point 12. In the shown embodiment the front leg 17 remains over the entire length of the side member 11 unchanged in its leg depth. It is, however, possible that the leg 17 also narrows starting from the connecting ear 14 up to the connecting point 12. Angled portions 18 and 19 are connected with the legs 16 and 17 of each side member 11 and 11', respectively. Whereas the angled portion 18 gradually decreased in its width starting from the connecting ear 14 up to the connecting point 12, the angled portion 19 can be retained over wide parts of the side member with identical width parallel to the leg 17, so as to first narrow in the last fourth of the length of the side member to the connecting point 12. It is, however, also possible that the angled portion 19 is formed so that its depth, starting from the cutting line VI—VI to the connecting point at the transverse member 10 gradually decreased. Thereby in the sense of the length of each side member, in these zones identical deformation takes place.

In the ideal case it is desirable that the side member 11 has no interruptions at any location of its side web 15. Since, however, it is necessary to provide operational openings 20, for example, for an actuating member for turning the back or mounting tongues 21 for the padding, the central region of each side web is used for this purpose. A compensation can be produced in that a respective deformation is provided at the leg 16 and/or 17, as well as at the angled portion 18 and/or 19, without noticeablely affecting the strength properties of the back frame.

When an accidentally great force is applied by a seat user onto the transverse member 10, it deflects rearwardly and the side members 11 or 11' turn in such a manner as shown, for example, in dash-dot lines in FIG. 6. A displacement of the profiled cross section takes place, whereas with increasing turning of the side member with first a relatively small force, a stability increase follows and reaches at a predetermined displacement of the profiled cross section its maximum value. This means, that the curve course in force-path diagram star first with a small rise and gradually transits in a strong rise.

Figure 7:
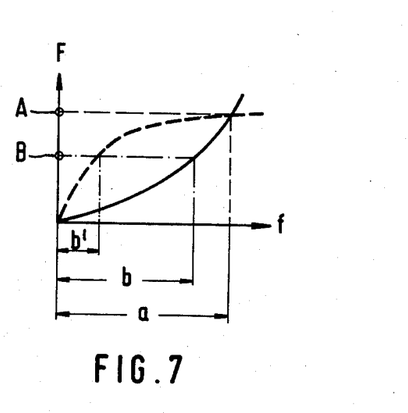
FIG. 7 is a view showing a force-path diagram of the inventive back frame.
Figure 8:
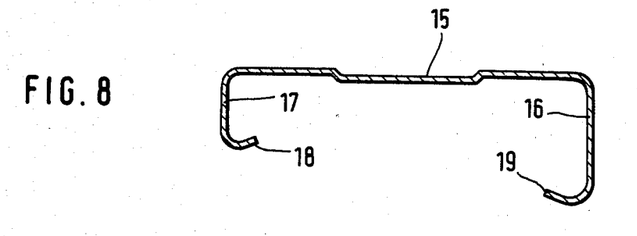
FIGS. 8-15 are views showing side members with various cross sections, taken analogously to the section VI—VI in FIG. 2.
Figure 9:
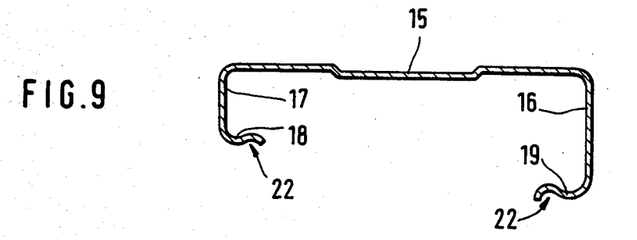
Figure 10:
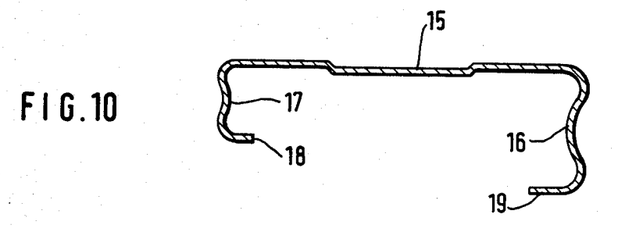
Figure 11:
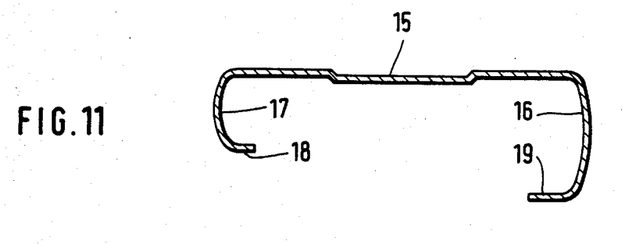

FIG. 7 shows a diagram in which the ordinate axis identifies the loading F and the abscisse axis identifies the path f. From the curve course of the back frame shown in the Figures, as identified in solid line, it can be seen that the lower loading of the back frame caused a person B with a lower weight results in a smaller small deflection b, than caused by the heavier person A whose deflection is identified with a. It can be easily recognized that in the event of a rigid back frame which is characterized by a curve course identified in dash line, the deflection path b caused by the person B is considerably smaller than the deflection path a caused by the person A, which latter is not changed. Because of this, in the event of rigid back frame the acceleration or deceleration acting on the person B is incomparably higher than for the person A, whereas in the back frame in accordance with the present invention no considerable difference in the sense of the acceleration or deceleration takes place in the action upon the person A and the person B.

As can be seen from FIGS. 8-15, the shapes of the cross sections of the side member 11 or 11' can considerably vary. In the side member shown in FIG. 8 the legs 16 and 17 are connected with the angled portions 18 and 19 which are bent inwardly toward the side web 15 toward a center plane of a cross section of the side member. In the side member shown in FIG. 9 corrugations 22 are formed in the angled portions 18 and 19. In the side members shown in FIG. 10 and 11 the angled portions 18 and 19 extend parallel to the side web 15, and the legs 16 and 17 are curved. In the side member of FIG. 10 the legs 16 and 17 are curved inwardly, whereas in the side member of FIG. 11 the legs 16 and 17 are curved outwardly.

Figure 12:
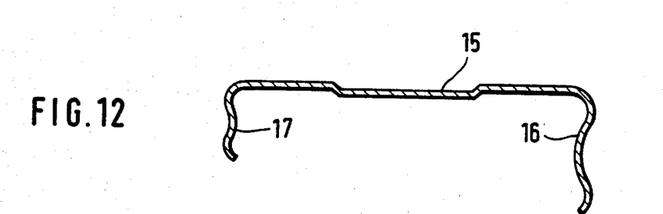
Figure 13:
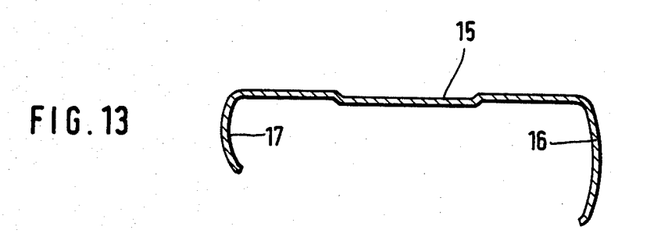
Figure 14:
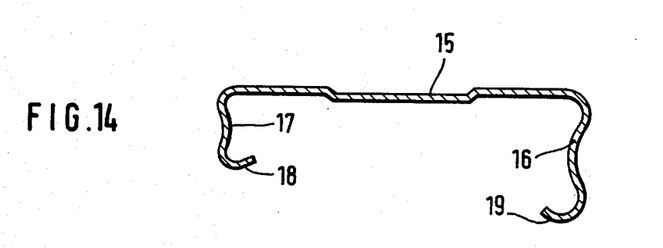
Figure 15:
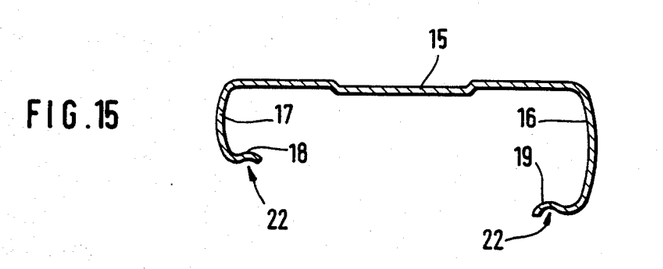

Depending upon the degree of curvature of the legs 16 and 17, the angled portions 18 and 19 can be completely dispensed with, as shown in FIGS. 12 and 13. In contrast to the side members shown in FIGS. 10 and 11, it is also possible that the angled portions 18 and 19 of the legs 16 and 17 provided with curvature are bent inwardly as shown in FIG. 14, or are provided with corrugations 22 as shown in FIG. 15.

Figure 16:
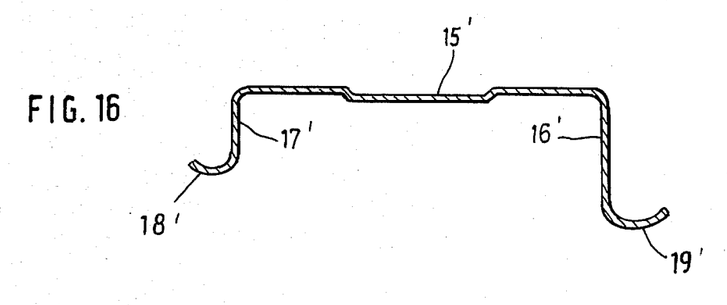
FIG. 16 is a view corresponding to the view of FIG. 8, but showing a side member in accordance with another embodiment of the invention.

Finally, as shown in FIG. 16, angled portions 18' and 19' of FIGS. 16' and 17' can extend outwardly away of a side web 15' and therefore away of the center plane of the cross section of the side member.

It will be understood that each of the elements described above, or two or more together, may also find a useful application in other types of constructions differing from the types described above.

While the invention has been illustrated and described as embodied in a back frame for a heat, particularly a power vehicle seat, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A back frame for a seat, particularly a power vehicle seat, comprising
a transverse member; and
two side members each having one end connected with said transverse member in a connecting point and another end provided with a connecting ear for connecting with a hinge of a seat pad frame, each of said side members having a U-shaped cross section with a web, and front and rear legs connected with said web and located at opposite sides of a center plane extending between said legs, said web of each of said side members narrowing from said connecting ear to said connecting point of the respective side member, said rear leg of each of said side members also narrowing from said connecting ear to said connecting point of the respective side member and being longer than said front leg so that the cross section of each of said side members is asymmetrical relative to the center plane of said cross section and the asymmetry reduces from the other end to said one end, at least one leg of at least one side member having a part which extends transverse to said center axis of said cross section of said at least one side member so that in the event of an accident and resulting high loading of said transverse member said side members are turnably deflected without breaking in the region of said one end.

2. A back frame as defined in claim 1, wherein said part of said at least one leg of said at least one side member extends toward said center plane of said cross section of said at least one side member.

3. A back frame as defined in claim 2, wherein said part of said at least one of said at least one side member extends away of said center plane of said cross section of said at least one side member.

4. A back frame as defined in claim 1, wherein said at least one leg of said at least one side member has a free end spaced from said web and provided with said part at said end.

5. A back frame as defined in claim 4, wherein said angled portion of said at least one leg is curved inwardly toward said web of said at least one side member.

6. A back frame as defined in claim 4, wherein said at least one angled portion of said at least one leg of said at least one side member has corrugations.

7. A back frame as defined in claim 4, wherein at least one angled portion of said rear leg reducingly narrows from said connecting ear in its initial length to said connecting point of said at least one side member with said transverse member.

8. A back frame as defined in claim 7, wherein the narrowing of said at least one angled portion of said rear leg of said at least one side member starts at a distance from said connecting ear.

9. A back frame as defined in claim 4, wherein the other leg of said at least one side member is also provided with such a part which extends transverse to said center plane of said cross section of the respective side member, each of said legs having such a free end spaced from said web and provided with said part at said end so as to form a C-shaped cross section.

10. A back frame as defined in claim 9, wherein said both legs of said at least one side member and said both angled portions of said legs narrow from said connecting ear to said connecting point of said at least one side member with said transverse member.

11. A back frame as defined in claim 9, wherein said both angled portions of said legs of said at least one side member have corrugations.

12. A back frame as defined in claim 1, wherein the narrowing of said rear leg of said at least one side members starts at a distance from said connecting ear of said at least one side member.

13. A back frame as defined in claim 12, wherein at least one angled portion of said rear leg reducingly narrows from said connecting ear in its initial length to said connecting point of said at least one side member with said transverse member.

14. A back frame as defined in claim 1, wherein said at least one side member has a predetermined height, said part of said at least one leg of said at least one side member being curved outwardly, the outward curvature of said part of said one leg extending over the entire height of said at least one side member.

15. A back frame as defined in claim 1, wherein said at least one side member has a predetermined height, the other leg of said at least one side member also having such a part which is curved outwardly, the outward curvature of said parts of said legs extending over the entire height of said side members.

16. A back frame as defined in claim 1, wherein said at least one side member has a predetermined height, said part of said at least one leg of said at least one side member being curved inwardly, the inward curvature of said part of said one leg extending over the entire height of said at least one side member.

17. A back frame as defined in claim 16, wherein said inwardly curved part of said one leg of said at least one side member is formed as a corrugation.

18. A back frame as defined in claim 1, wherein said at least one side member has a predetermined height, the other leg of said at least one side member also having such a part which is curved inwardly, the inward curvature of said parts of said legs extending over the entire height of said side members.

19. A back frame as defined in claim 1, wherein said at least one leg of said at least one side member has a predetermined width, said part of said at least one leg of said at least one side member being curved and its curvature extends over a part of the width of said at least one leg.

20. A back frame as defined in claim 1, wherein said legs of said at least one side member have a predetermined width, the other leg of said at least one side member also having such a part, said parts of said legs of said at least one side member being curved and their curvature extending over a part of the width of said legs.

21. A back frame as defined in claim 1, wherein said at least one part of said at least one leg is curved inwardly toward said web of said at least one side member.

22. A back frame as defined in claim 1, wherein said at least one leg of said at least one side member has a free end spaced from said web and an angled portion at said end.

* * * * *